Patented Apr. 10, 1928.

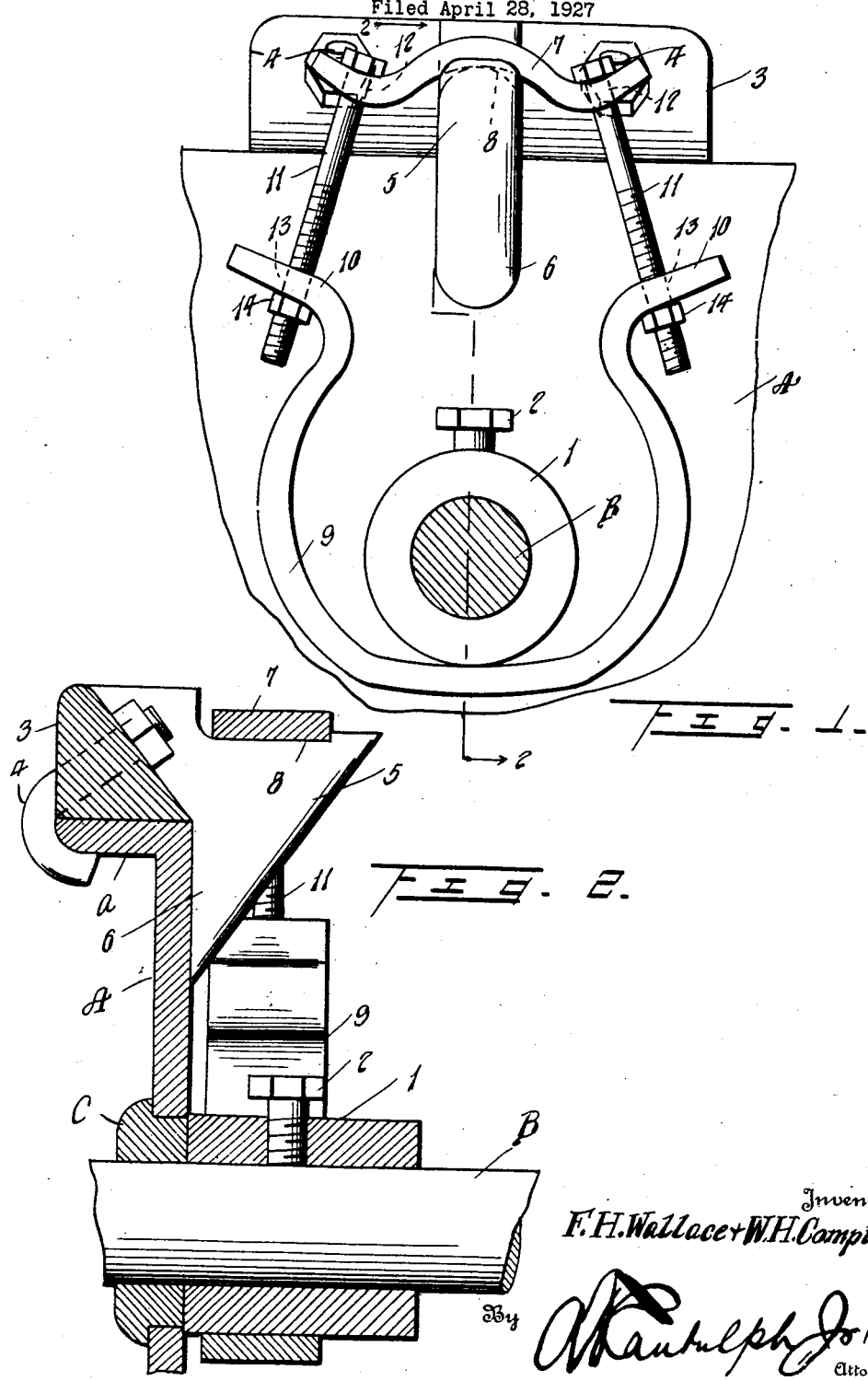

1,665,942

UNITED STATES PATENT OFFICE.

FRANK H. WALLACE AND WILLIAM H. COMPTON, OF NEWRY, SOUTH CAROLINA.

ROCKER-SHAFT BEARING.

Application filed April 28, 1927. Serial No. 187,275.

This invention relates to bearings for shafts that make only a part of a turn, such for instance as rocker shafts of looms, and because of the fact that the shaft makes but a partial turn it is not sufficiently lubricated to prevent undue wear, and the shaft in a short while wears egg-shape so as to interfere with its proper functioning.

The invention has for its object the provision of an improved means for supporting the rock shaft, such for instance as the rocker shaft of looms, comprising a bracket supported above the shaft, and when used on looms on the side frame of the loom, and having a sling supported on the bracket consisting of a yoke, the sling member will engage under the shaft and threaded members connecting the yoke and the sling to provide for adjustment of the sling relatively to the yoke. The invention also includes a sleeve secured to the shaft to insure a circular bearing for the shaft in its rocking movement.

The invention will be described in detail hereinafter and will be found illustrated in the accompanying drawings, in which Figure 1 is a view in elevation of the sling support for a rocker shaft, the shaft being shown in transverse section, and Figure 2 is a sectional view on a plane indicated by the line 2—2 of Figure 1.

In the drawings similar reference characters will be used to designate corresponding parts in both views.

The frame of a loom is suggested at A, and the rocker shaft at B, said rocker shaft as at present mounted on the loom frame being journaled in a bearing. In Figure 2 the bearing is designated C, but has been cut off on a plane corresponding to the plane of the inner side of the loom frame A, and a sleeve 1 is secured thereto by means of a set screw 2. Supported on the frame member A is a bracket 3 by means of hook clamps 4 engaging under a flange $a$ of the frame member A, and has a supporting member 5 projecting inwardly of the frame member A and extending downwardly from the top of the flange $a$ and engaging the inner side of the frame member A as shown at 6. 7 designates a yoke that is supported by the member 5, that is recessed as shown at 8 to provide a bearing for the yoke 7. 9 indicates a sling that engages under the sleeve 1 to support the rocker shaft B, and has upwardly and outwardly extended arms 10. 11 indicates threaded bolts engaging through openings 12 in the ends of yoke 7 and through openings 13 in the arms 10, 14 designating nuts mounted on the bolts 11 that are adjustable to adjust the length of the sling 9 to properly support the shaft B through engagement with the sleeve 1.

In operation it will be understood that the shaft B loosely rotates in the bearing C and the bearing forms a guide for the shaft, the support for the shaft, however, being the sling 9 engaging under the sleeve 1 so that as the shaft rotates the sleeve 9 by rotating with the shaft rides on the lower portion of the sling 9 and moves it back and forth thus obviating friction and the necessity of using oil to prevent wear of the parts.

What is claimed is:—

1. A shaft bearing, comprising a yoke, means to support the yoke, a sling adapted to engage under a shaft, and means adjustable in length connecting the yoke and sling.

2. A rock shaft bearing, comprising a bracket, a yoke mounted to rock on the bracket, a sling adapted to engage under an end of a rock shaft, upwardly and outwardly extended flanges on said sling, threaded bolts supported by said yoke and engaging said flanges, and nuts threaded on said bolts and engaging said flanges to support the sling.

In testimony whereof we affix our signatures.

FRANK H. WALLACE.
WILLIAM H. COMPTON.